US012165859B2

(12) United States Patent
Quint et al.

(10) Patent No.: US 12,165,859 B2
(45) Date of Patent: Dec. 10, 2024

(54) TECHNIQUES FOR CHECKING A VALIDITY OF A MASS AXIS CALIBRATION OF A MASS SPECTROMETER OF AN ANALYZER SYSTEM

(71) Applicant: Roche Diagnostics Operations, Inc., Indianapolis, IN (US)

(72) Inventors: Stefan Quint, Munich (DE); Florian Schweinberger, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 309 days.

(21) Appl. No.: 17/653,539

(22) Filed: Mar. 4, 2022

(65) Prior Publication Data

US 2022/0246412 A1 Aug. 4, 2022

Related U.S. Application Data

(63) Continuation of application No. PCT/EP2020/076027, filed on Sep. 17, 2020.

(51) Int. Cl.
*H01J 49/00* (2006.01)

(52) U.S. Cl.
CPC ................................ *H01J 49/0009* (2013.01)

(58) Field of Classification Search
CPC .. H01J 49/0009; H01J 49/004; H01J 49/0027; H01J 49/0031
See application file for complete search history.

(56) References Cited

U.S. PATENT DOCUMENTS

2003/0047680 A1* 3/2003 Figeys ............... G01N 33/6818 250/288
2008/0201095 A1 8/2008 Yip et al.
2014/0306106 A1* 10/2014 Olney ................ H01J 49/0031 250/282

FOREIGN PATENT DOCUMENTS

WO 2012/058632 A1 5/2012
WO 2013081581 A1 6/2013
WO 2015/040379 A1 3/2015

OTHER PUBLICATIONS

Garofolo, Fabian, LC-MS Instrument Calibration, Analytical Method Validation and Instrument Performance Verification, pp. 197-219, 2004, John Wiley and Sons (Year: 2004).*

(Continued)

*Primary Examiner* — David E Smith
(74) *Attorney, Agent, or Firm* — Taft Stettinius & Hollister LLP

(57) ABSTRACT

A method for checking a validity of a mass axis calibration of a mass spectrometer (MS) of an analyzer system, comprising obtaining a mass axis check sample spanning a predetermined m/z measurement range of the MS and automatically processing the sample, performing multiple full scan mode MS measurements of different types using the MS for the at least two mass axis points to obtain measurement data, wherein the different types include at least a first full scan MS measurement in a positive mode and a second measurement in a negative mode, or at least a first full scan measurement for a first mass filter and a second full scan measurement for a second mass filter; comparing the measurement data for each of the at least two mass axis points with respective reference data and determining if a condition is out of specification based on a result of the comparing steps.

17 Claims, 9 Drawing Sheets

(56) References Cited

OTHER PUBLICATIONS

Office Action, Japan Patent Office, Japanese Application No. 2022-516616, Mar. 20, 2023, 4 pages.
International Search Report issued Nov. 20, 2020, in Application No. PCT/EP2020/076027; 3 pp.

* cited by examiner

TECHNIQUES FOR CHECKING A VALIDITY OF A MASS AXIS CALIBRATION OF A MASS SPECTROMETER OF AN ANALYZER SYSTEM

CROSS-REFERENCE TO RELATED APPLICATIONS

This application is a continuation of International Application No. PCT/EP2020/076027, filed 17 Sep. 2020, which claims priority to European Application No. 19198025.9, filed 18 Sep. 2019, the disclosures of which are hereby incorporated by reference in their entirety.

BACKGROUND

There is growing interest for the implementation of mass spectrometry and more specifically of liquid chromatography coupled to mass spectrometry in the clinical laboratory and also in other laboratory settings. In these settings, it is frequently required to process a variety of different assays in a largely automated manner and, if possible, using a random-access mode (i.e., the analyzer can perform any one of multiple assays at any time compared to systems where a large number of samples requiring a particular assay are processed as a batch, or systems where only one or two assays are processed over longer periods of time). As a result, the mass spectrometer might have to provide for a relatively wide m/z measurement range at any given time to be prepared to process the respective assays.

This high flexibility can require a substantial amount of monitoring, quality control and calibration operations to ensure that the analyzer system operates according to specification. In particular, a mass axis of the mass spectrometer needs to be calibrated regularly as mass axis accuracy can be a key factor for the operation of the analyzer system.

Therefore, different mass axis calibration procedures are mandatory to secure a proper mass axis calibration. Many known calibration techniques involve dedicated manual processes which require interfering with the automated operation of the analyzer system. In addition, these calibration procedures can take relatively long periods of time (e.g., several tens of minutes or even more than one hour in some examples). Evidently, such procedures constitute a quite significant interference with the operation of the analyzer system which detracts considerably from the productivity of the analyzer system. Because of these reasons, there is a desire to limit the frequency of such mass axis calibration procedures. In some prior art analyzer systems a frequency of once per six months or once per year is proposed.

SUMMARY

The present disclosure relates to methods and apparatus for mass spectrometry and, in particular, to methods and systems for checking a validity of a mass axis calibration of a mass spectrometer of an analyzer system.

In accordance with one general aspect of the present disclosure, a method for checking a validity of a mass axis calibration of a mass spectrometer (MS) of an analyzer system is provided. The method comprises obtaining a mass axis check sample spanning a predetermined m/z measurement range of the mass spectrometer, and automatically processing the mass axis check sample. The automated processing of the mass axis check sample comprises performing multiple full scan mode MS measurements of different types using the MS for the at least two mass axis points within the predetermined m/z measurement range of the MS to obtain measurement data. The different types include at least a first full scan MS measurement in a positive mode and a second measurement in a negative mode or at least a first full scan measurement for a first mass filter of the mass spectrometer and a second full scan mode for a second mass filter of the mass spectrometer. The multiple different full scan MS measurements are selected so that a maximum measurement time in the mass spectrometer is below 5 minutes. The method further comprises comparing the measurement data for each of the at least two mass axis points with respective reference data, and determining if a mass axis calibration condition is out of specification based on a result of the comparing steps.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
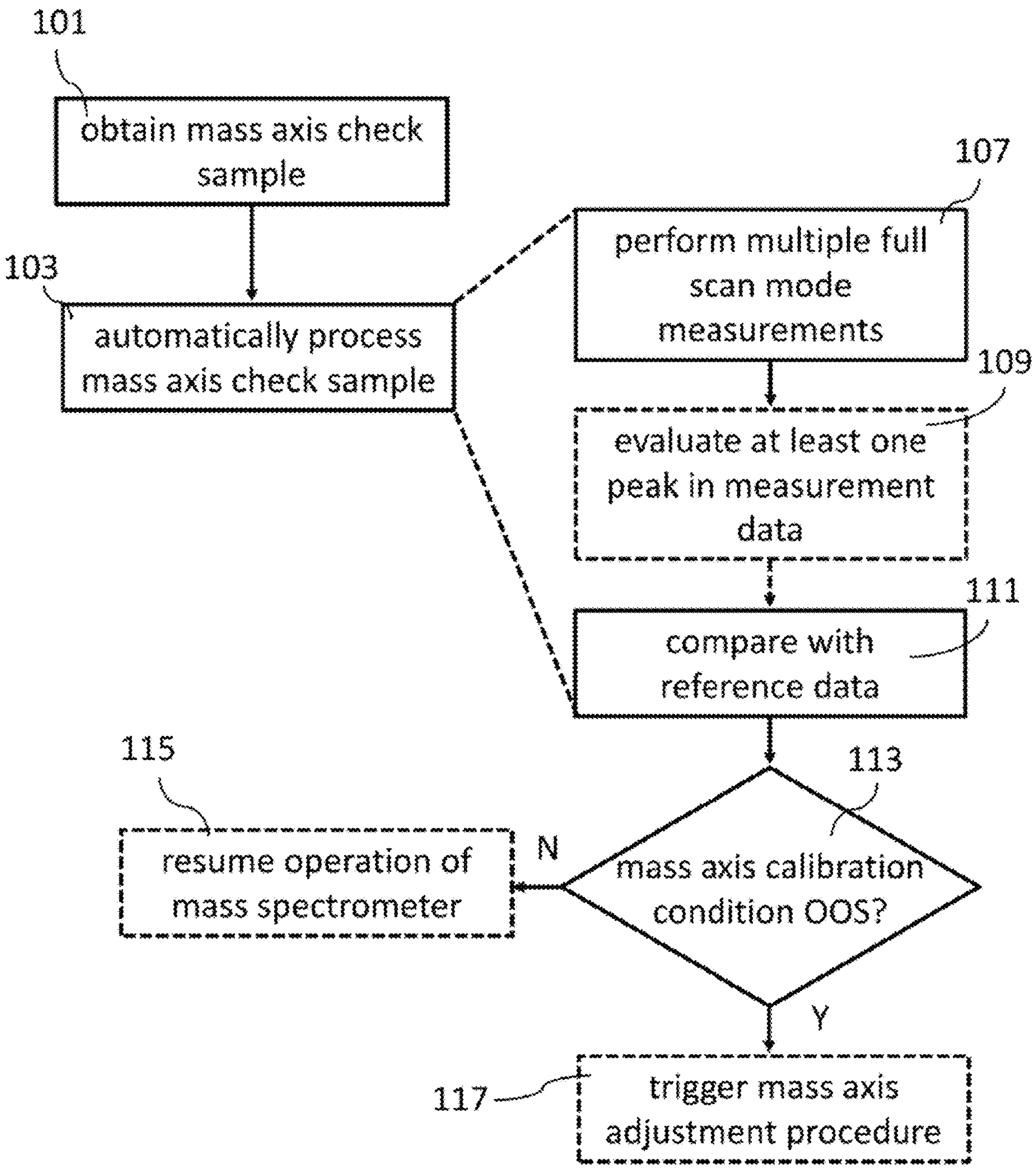
FIG. 1 is a flow diagram illustrating the mass axis checking technique of an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

In a second general aspect, the present disclosure relates to a computing system being configured to carry out the steps of the method of the first general aspect of the present disclosure.

In a third general aspect, the present disclosure relates to a computer readable medium including instructions stored thereon, which when executed by a processor of a computing system prompt the computing system to carry out the steps of the method of the first general aspect of the present disclosure.

Although the embodiments of the present disclosure are not limited to specific advantages or functionality, it is noted that in accordance with the present disclosure the technique of the first to third general aspects can have advantageous technical effects.

Firstly, the technique for checking a validity of a mass axis calibration of a mass spectrometer of an analyzer system can provide a relatively fast check of the mass axis accuracy compared to some prior art techniques. In this manner, the mass axis check procedure can be carried out (relatively) frequently and without causing a substantial interference with the operation of the analyzer. The technique of the present disclosure makes use of the insight that even a relatively short measurement time can be sufficient to gain insight into a mass axis calibration state of the mass spectrometer (even though the measurements carried out in this short measurement time might be insufficient for an actual mass axis calibration). In other words, the technique of the present disclosure involves performing a possibly rough "status check" of the mass axis calibration. The check of the present disclosure might not yield sufficient information to carry out a mass axis adjustment. Rather, it is designed to spot if something is wrong which needs further attention (or not so that the analyzer can resume its normal operation).

Secondly, the mass axis checking technique of the present disclosure can be carried out without (or with very little) additional hardware in automated analyzer systems. For example, an analyzer stream also used for processing patient samples (e.g., a LC stream connected to an MS) can be used to process the mass axis check sample of the mass axis check techniques of the present disclosure.

In addition or alternatively, the mass axis check sample can be readily available in the analyzer system (e.g., quality control samples or internal standards) in any case, so no additional consumables have to be specially provided in some examples. Moreover, the mass axis check sample can be prepared by the analyzer system on the spot in some examples (while it is also possible to provide the mass axis check sample in an additional cassette or other vessel).

Thus, the mass axis check procedure can be carried out in existing analyzer systems without modifying its hardware in some examples.

Thirdly, the techniques of the present disclosure can allow for preventive scheduling of calibration or maintenance operations by providing a more close-knit frequency of mass axis check operations. This might not be feasible when using some prior art techniques, as carrying out these techniques disrupts the normal operation of the analyzer, and due to their relatively long duration. In this manner, more consequential failures which might result in prolonged analyzer downtime can be prevented in some situations.

The term "measurement time in the mass spectrometer" relates to a period during which a particular sample is processed by a mass spectrometer of an analyzer system.

An "analyzer system" according to the present disclosure is an automated laboratory apparatus dedicated to the analysis of samples (e.g., samples for in vitro diagnostics). For example, an analyzer system can be a clinical diagnostics system for performing vitro diagnostics.

The analyzer systems of the present disclosure can have different configurations according to the need and/or according to the desired laboratory workflow. Additional configurations may be obtained by coupling a plurality of apparatuses and/or modules together. A "module" is a work cell, typically smaller in size than the entire automated analyzer system, which has a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical apparatuses, designed to execute respective workflows that are optimized for certain types of analysis.

The analyzer systems of the present disclosure include a mass spectrometer, optionally in combination with a liquid chromatography device (LC). In addition, the automated analyzer system can include analytical apparatuses for one or more of clinical chemistry, immunochemistry, coagulation, hematology, etc.

Thus, the analyzer system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The automated analyzer system can comprise functional units such as liquid handling units for pipetting and/or pumping and/or mixing of samples and/or reagents and/or system fluids, and also functional units for sorting, storing, transporting, identifying, separating, detecting.

The term "sample" refers to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents e.g., to enable carrying out one or more in vitro diagnostic tests, or for enriching (extracting/separating/concentrating) analytes of interest and/or for removing matrix components potentially interfering with the detection of the analyte(s) of interest.

The term "sample" is tendentially used to indicate a sample before sample preparation whereas the term "prepared sample" is used to refer to samples after sample preparation. In non-specified cases the term "sample" may generally indicate either a sample before sample preparation or a sample after sample preparation or both. Examples of analytes of interest are vitamin D, drugs of abuse, therapeutic drugs, hormones, and metabolites in general. The list is however not exhaustive.

In particular, the analyzer system comprises a sample preparation station for the automated preparation of samples. A "sample preparation station" is a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner: pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing . . . )

A "reagent" is a substance used for treatment of a sample in order e.g., to prepare a sample for analysis, to enable a reaction to occur, or to enable detection of a physical parameter of the sample or analyte contained in the sample. In particular, a reagent can be a substance that is or comprises a reactant, typically a compound or agent capable e.g., of binding to or chemically transforming one or more analytes present in a sample or an unwanted matrix component of the sample. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent is used to include any fluid that can be added to a sample including a dilution liquid, including water or other solvent or a buffer solution, or a substance that is used for disruption of specific or nonspecific binding of an analyte to a protein, binding proteins or surfaces.

Sample may be provided for example in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

An "LC stream" is a fluidic line comprising at least one capillary tubing and/or LC column comprising a stationary phase selected according to the type of sample(s) and analytes and through which a mobile phase is pumped in order to trap and/or separate and elute and/or transfer analytes of interest under selected conditions, e.g., according to their polarity or log P value, size or affinity, as generally known. The at least one LC column in the at least one LC stream may be exchangeable. In particular, the LC separation station may comprise more LC columns than LC streams, where a plurality of LC columns may be interchangeably coupled to the same LC stream. A capillary tubing may bypass an LC column or may allow adjustment of dead volumes to fine-tune elution time windows.

Unless specified differently in the respective context, the terms "about" in connection with values for parameters means to include a deviation of +/−10% from the specified value in the present disclosure.

In order that the embodiments of the present disclosure may be more readily understood, reference is made to the following examples, which are intended to illustrate the disclosure, but not limit the scope thereof.

First, an overview over the techniques of the present disclosure will be given in connection with FIG. 1. Further aspects of the mass axis checking technique of the present disclosure will subsequently described in the context of FIGS. 2 to 8. Last, aspects of the analyzer systems of the present disclosure will be discussed in connection with FIG. 9.

FIG. 1 is a flow diagram illustrating the mass axis checking technique of the present disclosure.

The method for checking a validity of a mass axis calibration of a mass spectrometer of an analyzer system comprises obtaining 101 mass axis check sample spanning a predetermined m/z measurement range of the mass spectrometer and automatically processing 105 the mass axis check sample. This automatic processing step includes a set of sub-steps.

In particular, the technique includes performing 107 multiple full scan mode MS measurements of different types using the MS for the at least two mass axis points within the predetermined m/z measurement range of the MS to obtain measurement data. The different types can include at least a first full scan MS measurement in a positive mode and a second measurement in a negative mode and/or at least a first full scan measurement for a first mass filter of the mass spectrometer and a second full scan mode for a second mass filter of the mass spectrometer.

The multiple different full scan MS measurements are selected so that a maximum measurement time in the mass spectrometer is below 5 minutes. The "measurement time in the mass spectrometer" refers to a time following an injection of the mass axis check sample into the mass spectrometer while the actual mass spectrometer measurement takes place. The "measurement time in the mass spectrometer" does not include, e.g., processing time of the mass axis check sample in a liquid chromatograph or other optional module located upstream of the mass spectrometer. In addition, the "measurement time in the mass spectrometer" does not include preparation steps of the mass axis check sample which might take place in some examples.

The method further includes comparing 111 the measurement data for each of the at least two mass axis points with respective reference data and determining 113 if a mass axis calibration condition is out of specification based on a result of the comparing steps.

In some examples, if the mass axis calibration condition is out of specification, a mass axis adjustment procedure including separate measurements is triggered 115. If the mass axis calibration condition is within specification (i.e., not out of specification), the operation of the mass spectrometer can be resumed 117. Other responses which can be triggered will be discussed below.

As discussed above, the measurements of the mass axis checking technique of the present disclosure can be carried out relatively quickly (i.e., having a measurement time of less than 5 minutes). In some examples, the measurement time in the mass can be below 2 minutes or less than 1 minute.

In many situations, the analyzer system including the mass spectrometer can operate based on a certain clock, i.e., a predetermined period of time for which a mass spectrometer processes one particular sample in a single measurement process (also referred to as "measurement window" herein). For example, as discussed below, a duration of this predetermined period can be a duration less than 5 minutes (e.g., a duration less than 1 minute, or a duration of 36 s). In some examples, this predetermined period is a period in which one of multiple chromatography streams is connected with the mass spectrometer. The automated scheduler of this type of analyzer system can schedule processing slots of the mass spectrometer in time slots having a duration of the predetermined period.

The techniques of the present disclosure can include scheduling processing of the mass axis check sample in an automated scheduling process of the analyzer system. The scheduling of the processing of the mass axis check sample in an automated scheduling process can include minimizing an impact on the throughput of the mass spectrometer or an analyzer including the mass spectrometer (e.g., by carrying out a particular optimization technique). For example, the scheduler can fill idle times of the automated analyzer/the mass spectrometer with the mass axis checking procedures described herein. For instance, the scheduler can schedule the mass axis checking procedures when no patient sample is processed, or when a work-load of the analyzer system is low.

In some examples, the maximum measurement time is selected as a duration of a measurement window of a production sample of the mass spectrometer (or can be shorter than the measurement window). In other examples, the maximum measurement time of the method of checking a validity of a mass axis calibration of a mass spectrometer is selected as an integer multiple of a duration of this measurement window. This can allow inserting a mass axis check of the present disclosure in the "normal" scheduling and processing operations of the analyzer systems. Many prior art calibration techniques are too long and/or require modifications of the analyzer system and thus cannot be included in the "daily operation" of an analyzer system effortlessly.

In some examples, the different measurements carried out in the mass axis checking technique can be selected so that a maximum measurement time is not exceeded. Depending on the analyzer system, this might allow a greater or smaller number of different measurements be performed for the at least two mass axis points covering the measurement range of the mass spectrometer. In any case, the techniques of the present disclosure include performing different types of full scan mode MS measurements during this duration.

In still other examples, the method of checking a validity of a mass axis calibration of a mass spectrometer includes less than 50 measurement cycles (e.g., less than 40 measurement cycles) with a mass interval of at least 2 amu (e.g., at least 3 amu). A "measurement cycle" of the mass spectrometer in this context refers to a single scan covering a m/z ratio range scanned in a measurement. A "mass interval" refers to a distance (on the mass axis) between two different measurement points of the scan. When a lower step size is selected, a higher number of measurement points is generated for a particular m/z ratio range (and vice versa).

The technique of FIG. 1 uses the mass axis check sample spanning a predetermined m/z-measurement range of the mass spectrometer. In some examples, the predetermined measurement range of the mass spectrometer is a maximal measurement range provided by the mass spectrometer. In other words, the predetermined measurement range can be a maximal measurement range for which a particular model or type of mass spectrometer is designed. The measurement range of the mass spectrometer can span 10 amu to 5000 amu, optionally 15 amu to 3000 amu.

In addition or alternatively, the predetermined m/z-measurement range of the mass spectrometer can be defined by a plurality of analytes to be analyzed by the mass spectrometer. In these examples, the full m/z-measurement range can span an m/z range from an analyte requiring the lowest m/z ratio to an analyte requiring the highest m/z ratio of the plurality of analytes to be measured by the mass spectrometer. In these examples, a full measurement range might change (even for the same type of analyzer) depending on the assays to be processed by the analyzer.

For instance, if a lowest m/z ratio of a set of analytes is between 120 amu and 140 amu for valproic acid and a highest m/z ratio is between 1200 amu and 1210 amu for Cyclosporin A, a predetermined m/z measurement range can range between 100 amu and 1300 amu. For a different set of analytes, this range can be different. In some examples, the predetermined m/z-measurement range might also change over time for a particular mass spectrometer, e.g., if the set of analytes to be processed by the mass spectrometer changes.

In any case, the techniques of the present disclosure aim at measurement ranges having a particular minimum breadth. For example, the minimum breadth of the measurement range can be 1000 amu or 5000 amu.

In the techniques of the present disclosure, a mass axis check sample is used to facilitate the mass axis checking process. In some examples, the mass axis check sample includes a mix of two or more different substances spanning a full m/z-measurement range of the mass spectrometer, wherein the at least two mass axis points are provided by different substances in the mix. The mass axis check sample can include one or more analytes, solvent molecules, additives, and salts. In some examples, an internal standard can be used as mass axis check sample. Further aspects of the mix will be discussed below.

Example Mass Axis Checking Technique

Figure 2:
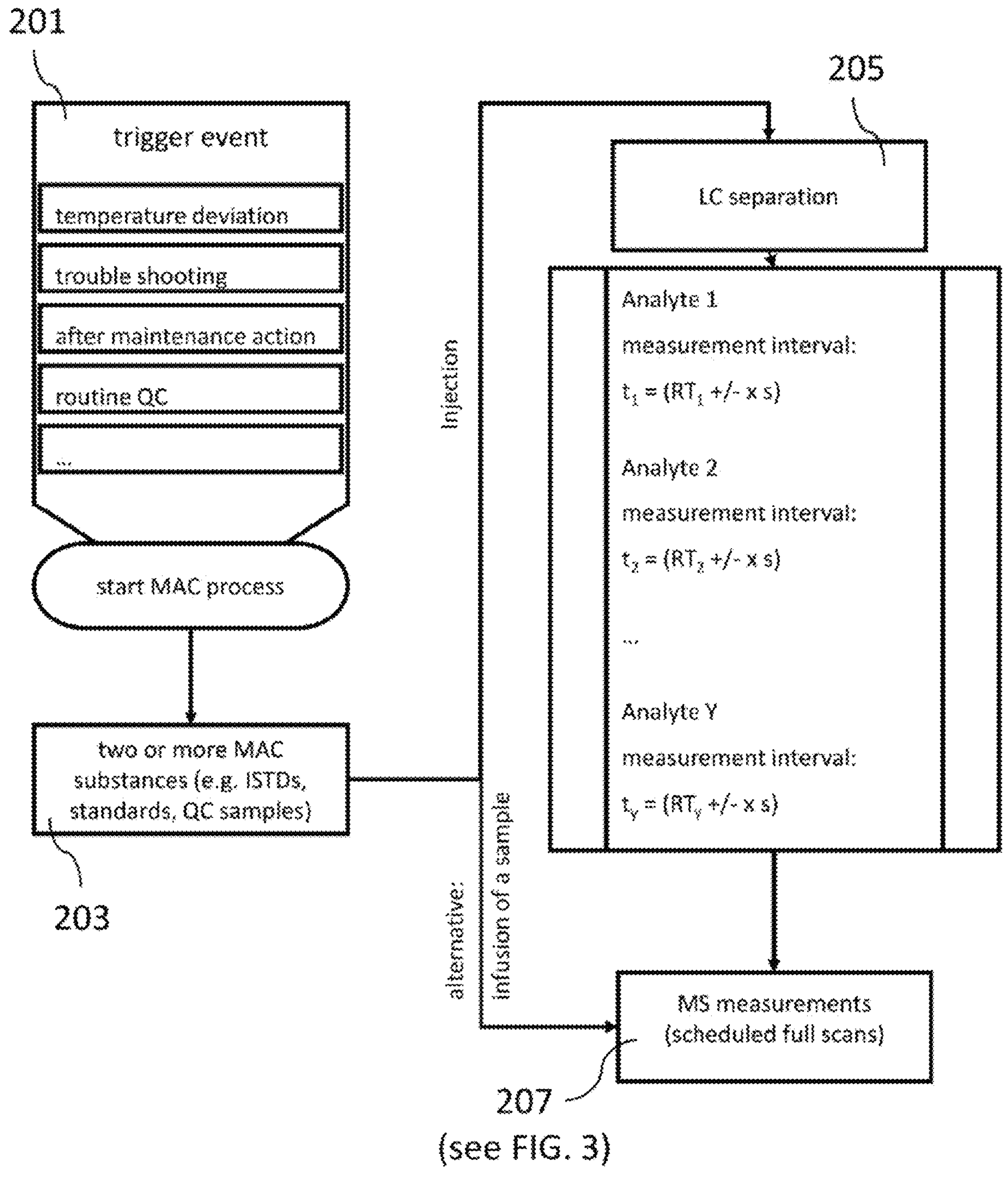
FIG. 2, FIG. 3 and FIG. 4 are flow diagrams illustrating an example mass axis checking technique of the present disclosure.
Figure 3:
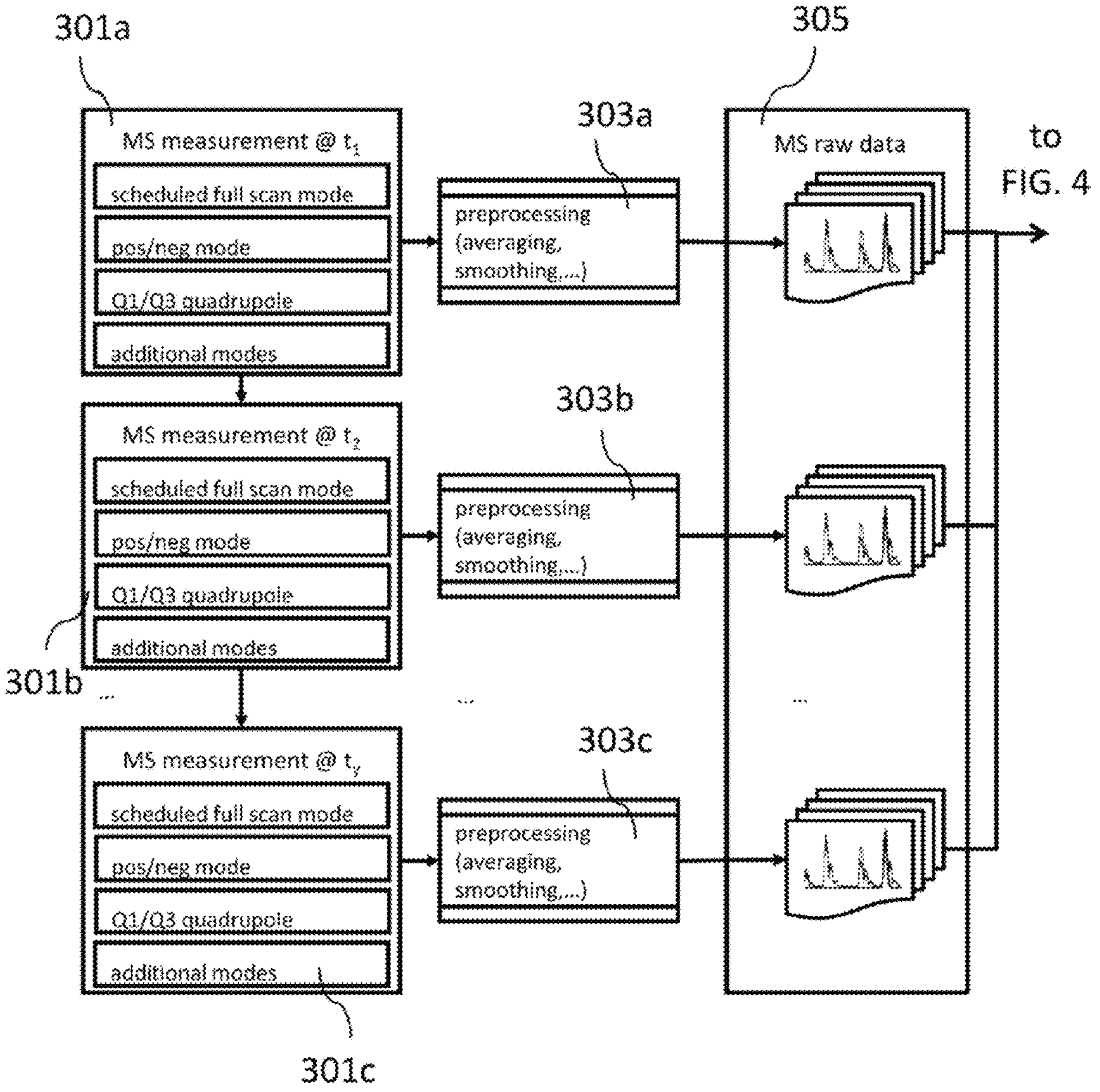
Figure 4:
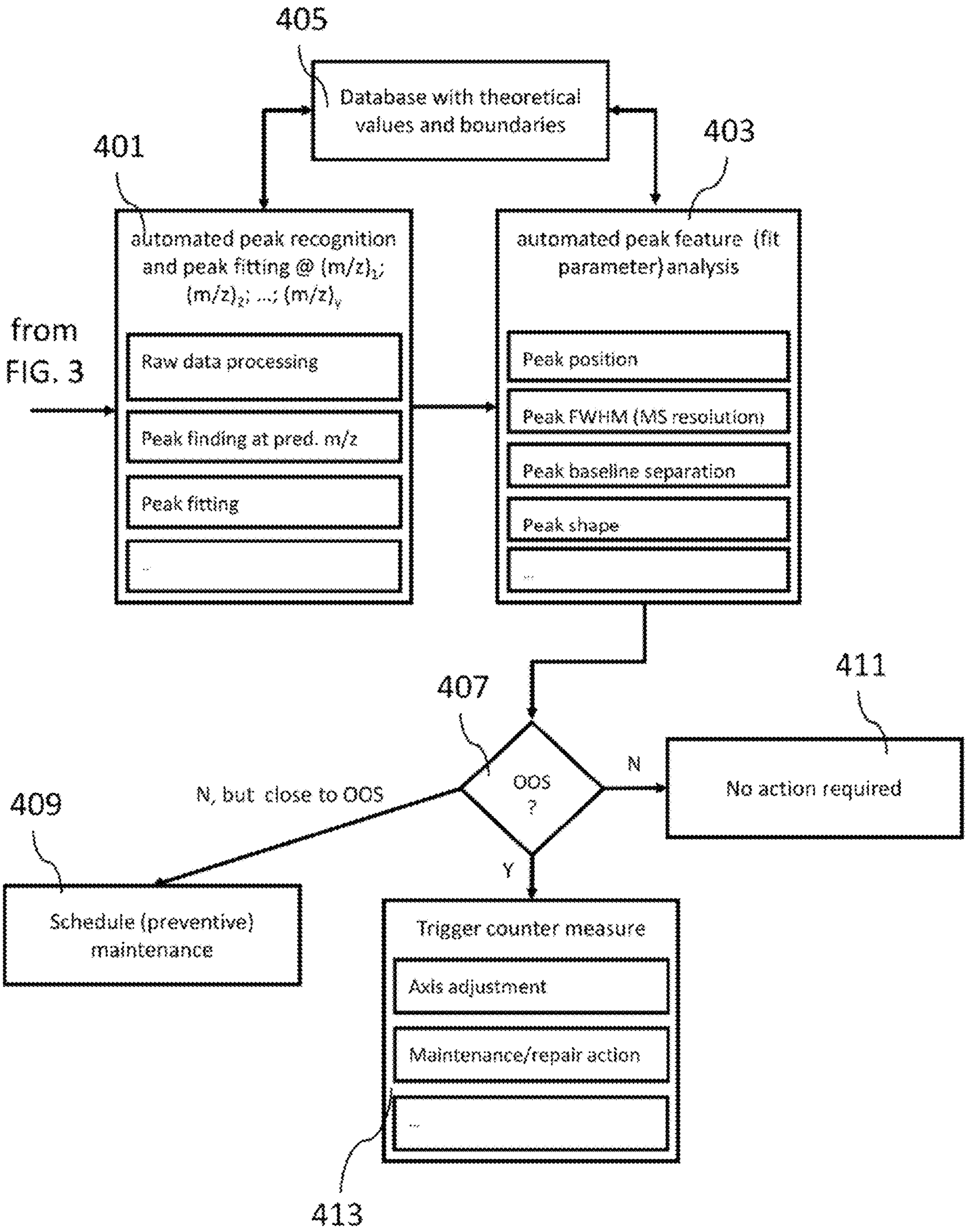

FIG. 2, FIG. 3 and FIG. 4 are flow diagrams illustrating an example mass axis checking technique of the present disclosure.

In FIG. 2, a mass axis checking technique starts 201 with a trigger event. The trigger event can be that a particular routine or operation is carried out in the analyzer system or the mass spectrometer. For example, the method can be carried out at one or more of the following occasions 1) during a quality control routine of the mass spectrometer or of the analyzer including the mass spectrometer, 2) during a regular instrument check of the mass spectrometer or of the analyzer including the mass spectrometer, 3) during a start-up procedure of the mass spectrometer or of an analyzer including the mass spectrometer, 4) during a down-time of the mass spectrometer or of the analyzer including the mass spectrometer or 5) during or after a service or maintenance operation of the mass spectrometer or of the analyzer including the mass spectrometer.

In all of these examples, the relatively short mass axis checking routine can be conveniently integrated (in an automated manner) in the process flow. In particular, the above routines can be scheduled by a scheduler of the automated analyzer. In other situations, the above routines can involve manual operations or triggered by a decision of an operator. Nevertheless, a scheduler of the automated analyzer can detect that the routine is to be performed and schedule a mass axis checking technique of the present disclosure.

In other examples, the trigger event including one or more of 1) a status change of the mass spectrometer or the analyzer system including the mass spectrometer, 2) a monitored parameter of the mass spectrometer or the analyzer system including the mass spectrometer assuming a particular value or passing a particular threshold, 3) a monitored parameter of an environment of the mass spectrometer or 4) a detection of an error in the mass spectrometer or the analyzer system including the mass spectrometer.

For example, as indicated in FIG. 2 a temperature deviation might be detected in the analyzer system (e.g., the mass spectrometer) or in the environment of the analyzer (changes of other parameters, e.g., humidity can also be detected in other examples). This can trigger the mass axis checking procedure of the present disclosure.

In the previous sections, several trigger events have been discussed. However, the techniques of the present disclosure can also be performed repeatedly during a production mode of the mass spectrometer. In some examples, the method can be performed at regular time intervals. For example, the method can be performed at least once every hour, at least once every day, or at least every second day (e.g., once every day) for a particular mass spectrometer.

In addition or alternatively, the method can be performed after a particular number of samples has been processed by the analyzer system including the mass spectrometer. For instance, the method can be performed at least once every 100 samples processed by the mass spectrometer (e.g., at least once every 400 samples analyzed by the mass spectrometer or at least once every 1000 samples analyzed by the mass spectrometer).

The mass axis checking process continues with a mass axis check sample preparation step 203.

This step can involve different operations.

In some examples, the analyzer system can mix different substances (e.g., the two or more substances of the mix and optionally additional adjuvants). For example, a sample preparation station (e.g., a pipettor) can be used to prepare the mix of two or more substances.

In some cases, the material necessary to prepare the mix of two or more substances can be present in the analyzer system in any case. For instance, internal standards (or constituents thereof), other type of standards or quality control samples can be used to prepare the mix in some examples. Other material present in the analyzer system can be used in other examples. In these cases, additional consumables might not be required to carry out the mass axis checking technique of the present disclosure. It is merely required that a composition of the employed material is known to ensure that the mass axis checking process can be carried out.

In other examples, the mass axis check sample (e.g., a mix of two or more substances or any precursor of the mix) can be provided to the analyzer system. For example, a pre-prepared mass axis check sample can be provided to the analyzer system. The mix can be included in any suitable container and stored in a respective storage area of the automated analyzer.

In the example of FIG. 2, the mass axis check sample preparation step takes place after occurrence of a trigger event. In other examples, the automated analyzer can prepare the mass axis check sample (e.g., a mix of the two or more substances) proactively or in regular intervals to be used once a trigger event occurs.

Additional aspects of the composition of the mass axis check sample (e.g., a mix of two or more substances) will be discussed next. In some examples, a minimum of two substances having peaks different m/z ratios is considered to be required to detect a calibration status of a mass axis. However, the mix might include three or more or four or more different substances spanning the measurement range of the mass spectrometer in some examples. For example, if three substances are used, the peaks evaluated for the first and second substances can be located at the extremes of the measurement range (e.g., within 10% of a minimum/maximum m/z ratio of the measurement range). A peak of the third substance can be located in the middle of the measurement range (e.g., at an m/z ratio between 40% to 60% of a measurement range).

In general, the mass axis check sample can include any substance which has peaks at m/z ratios suitable to span a particular measurement range.

In other examples the mass axis check sample can also include a single substance which can be used to check the at least two mass axis points. For instance, a single substance can be able to fragment into two or more suitable fragments (i.e., fragments of different m/z values) in the mass spectrometer which provide measurement data at the at least two mass axis points. The skilled artisan is aware of substances fragmenting into different m/z values spanning a full m/z-measurement range of the mass spectrometer.

In still other examples, the mass axis check sample can include one or more substances selected to form clusters by a combination of ions or atoms or molecules of a chemical species (e.g., in association with a second species) in the mass spectrometer at different m/z values to provide the at least two mass axis points. Mass spectra obtained by tandem mass spectrometry of cluster ions can be characterized by a base peak having a magic number of molecules that is less than and closest to the number of molecules in the precursor ion. Under suitable ESI conditions, clusters covering a predetermined m/z range can be recorded.

In some examples, the prepared mass axis check sample is injected into a chromatograph for chromatographic separation 205. In particular, the chromatograph can be a liquid chromatography (LC) device. Example LC devices which can be used for the techniques of the present disclosure will be discussed below in connection with FIG. 9.

In some examples, other separation techniques for separating the substances than chromatographs can be used. In still other examples, the (chromatographic) separation can be dispensed with completely. For instance, if the mass axis check sample (e.g., a mix of two or more substances) is present in a sufficiently concentrated form, the mass axis check sample can be provided to the mass spectrometer directly without undergoing a separation step.

However, in many situations it can be necessary and/or useful to process the mass axis check sample in a combination of a separation device (e.g., an LC device) and a mass spectrometer. In general, the techniques of the present disclosure can include processing the mass axis check sample (e.g., a mix of two or more different substances) in a single chromatography run, e.g., to separate substances contained in the mass axis check sample prior to the step of performing multiple full scan mode mass spectrometry measurements as described in the present disclosure.

Returning to FIG. 2, the separation process can split the mix of two or more substances in time. For instance a first substance ("analyte 1") can be provided a first retention time ($RT_1$), a second substance ("analyte 2") can be provided a first retention time ($RT_2$), and a y-th substance ("analyte Y") can be provided a y-th retention time ($RT_y$).

The technique of the present disclosure can include defining a measurement window for each of the separated substance. The measurement windows can be disjunct and predefined measurement windows for each substance. For example, each measurement window can have a duration of less than 30 s, optionally less than 20 s.

For each of the (separated) substances, different types of full scan mode mass spectrometry measurements can be performed 207. This will be discussed in connection with FIG. 3 in more detail subsequently.

FIG. 3 depicts three sets (i.e., multiplicities) of full scan mode mass spectrometry measurements 301*a*, 301*b*, 301*c* which are carried three different separated substances. In general, the techniques of the present disclosure can involve carrying out any type of full scan mode mass spectrometry measurement on different substances of the mass axis check sample. In some examples, the same set of measurements is carried out for each of the (separated) substances. In other examples, different types of mass spectrometry measurements are carried out for different ones of the different substances of the mix.

In particular, the different measurements can be selected from the list consisting of 1) a measurement in a negative mode, 2) a measurement in a positive mode, 3) a measurement for a particular mass filter of the mass spectrometer, 4) measurements with different scan speeds and 5) measurements with different scan resolutions.

For example, the different measurements can include measurements in a positive and in negative mode for a particular substance of the mass axis check sample.

In addition or alternatively, the different measurements can include measurements for a Q1 mass filter and a Q3 mass filter (of a tandem mass spectrometer) for a particular substance.

A measurement range for the MS measurements can be relatively small in some examples. For instance, the measurement range for the MS measurements can be narrower than 30 amu, optionally lower than 10 amu, and further optionally narrower than 2 amu.

The process can include different optional preprocessing steps 303*a*, 303*b*, 303. For example, the method can include averaging over multiple scans and/or smoothing operations.

In this manner, mass spectrometry raw data 305 is generated for each of the at least two mass axis points. This raw data 305 are subsequently processed to determine if a mass axis status of the mass spectrometer is within or out of specification. Additional aspects of this step will be discussed in connection with FIG. 4 in the subsequent sections.

The raw data obtained in the mass spectrometry measurements can be automatically processed in different ways in the step of evaluating at least one peak in the measurement data for each of the at least two mass axis points to obtain at least one measurement parameter for each of the at least two mass axis points.

For example, evaluating at least one peak in the measurement data for each of the at least two mass axis points can include fitting at least one peak in the measurement data for each of the at least two mass axis points to obtain the at least one measurement parameter for each of the at least two mass axis points. For example, a single peak can be evaluated for each of the at least two mass axis points. In other examples, two peaks or more than two peaks can be evaluated.

In FIG. 4, the evaluating of at least one peak includes an automated peak recognition process and an automated peak fitting 401. This step can include any suitable numerical peak finding and fitting procedure. For example, a predetermined set of m/z ratio values for the peaks to be found can be used. The predetermined m/z ratio values can be retrieved from a database 405 storing this data to be used in the peak recognition and peak fitting process.

In a further step, at least one measurement parameter for each of the at least two mass axis points is obtained 403. This can include an automated peak feature analysis.

The measurement parameter (e.g., peak feature) can include one or more of a peak position, a peak width, a peak-baseline separation and a peak shape. The measurement parameters (e.g., peak features) will be discussed in more detail in connection with FIG. 8 below.

In some examples, more than one parameter is obtained for each peak (or for some peaks). For instance, the at least one measurement parameter includes a peak position and a peak width.

Once the at least one measurement parameter (e.g., peak feature) has been obtained, it can be determined if the mass axis condition is out of specification, or not 407.

This determination involves comparing the at least one measurement parameter for each of the at least two mass axis points with respective reference data. For instance, reference data for measurement parameters (peak features) can be obtained from a database 405. In some examples, the database 405 includes theoretical values for the measurement parameters (peak features). In other examples, the database 405 includes measured reference values for the measurement parameters (peak features).

In addition, the database 405 can include boundaries for the reference data which define the deviation from a (e.g., theoretical) value which is still considered to be acceptable.

The reference values and the boundaries can be used in the comparing step to determine if a particular measurement value (peak feature) is within an acceptable range or not. If one or more (or two or more) of the measurement values (peak features) is without an acceptable range, it can be determined that the mass axis is out of specification.

However, the comparing of the at least one measurement parameter for each of the at least two mass axis points with respective reference data can also be performed in different ways. For example, a boundary around a reference value can be determined on the fly (e.g., there are no fixed boundary values). In addition, multiple different comparison metrics can be employed. For instance, relative or absolute deviations from a reference value can be evaluated. In other examples, acceptance ranges for the measurement values (peak features) can be directly defined. It is also possible to dynamically generate and/or update the reference data.

In some examples, a binary decision is taken (e.g., "within specification" or "out of specification"). In this case, if the mass axis is within specification, a normal operation of the analyzer system including the mass spectrometer can be resumed 411. If the mass axis is out of specification, a counter measure can be triggered 413. In general, this can involve triggering a mass axis adjustment procedure including separate measurements. In addition or alternatively, a maintenance and/or repair operation can be triggered. In some examples, these counter measures can be carried out automatically by the analyzer system. However, in other cases the counter measures require an intervention by an operator and/or service personnel. In these cases, the analyzer system can send messages and/or issue warnings to the operator and/or service personnel. For example, a warning and/or error message can be issued on a (possibly remote) user interface of the automated analyzer.

In other examples, the binary decision can include triggering other actions than the actions discussed above. For example, a preventive maintenance (e.g., mass axis adjustment) can be scheduled or triggered. This might require a different definition of the boundaries for detecting when the measurement values (peak features) are out of specification.

In still other examples, the determination step can include distinguishing between three classes, or three or more classes and triggering different reactions (or non-reactions).

As shown in FIG. 4, an additional class to the two classes discussed above can be that the mass axis is within specification but within a predetermined distance from a threshold to being out of specification. In other words, the mass axis is close to being out of specification. In this situation, a dedicated reaction can be triggered. For instance, the automated analyzer can schedule a preventive maintenance operation. In this manner, a down-time of the analyzer system can be reduced by preventing a more consequential error and/or scheduling a maintenance operation at a convenient time (e.g., when the automated analyzer is off duty).

More than three classes of reactions (e.g., the different reactions discussed herein) can be triggered in still different examples.

Again, this flexibility in triggering reactions is facilitated by the short mass axis check procedures of the present disclosure. When using prior art techniques the long duration and/or complexity of the procedure might not allow checking the mass axis condition regularly to schedule a predictive maintenance operation.

In the preceding sections several aspects of the mass axis checking technique of the present disclosure have been elucidated in some detail. In the following sections, further details regarding the measurement results and data processing according to the present disclosure will be discussed.

Example Measurement and Data Processing Results

FIG. 5, FIG. 6, FIG. 7 and FIG. 8 illustrate example measurement and evaluation results obtained when using the techniques of the present disclosure. In that, FIG. 5, FIG. 6, FIG. 7 and FIG. 8 follows the mass spectrometry measurement steps of the example mass axis checking technique shown in FIG. 2 to FIG. 4.

As discussed, a mass axis check sample (e.g., a mix of two or more substances) can undergo separation (and enrichment) in an LC process ("1. LC separation of multiple analytes" in FIG. 5).

In the example of FIG. 5 to FIG. 8, an example mix includes five different substances or analytes: testosterone, tacrolimus, cyclosporin A, cortisol and valproic acid. However, this set of substances or analytes is merely exemplary. As discussed above, a larger or smaller number of substances spanning the measurement range of a mass spectrometer can be used. In addition, example substances that can be used in the mix of the two or more substance are listed above.

Figure 5:
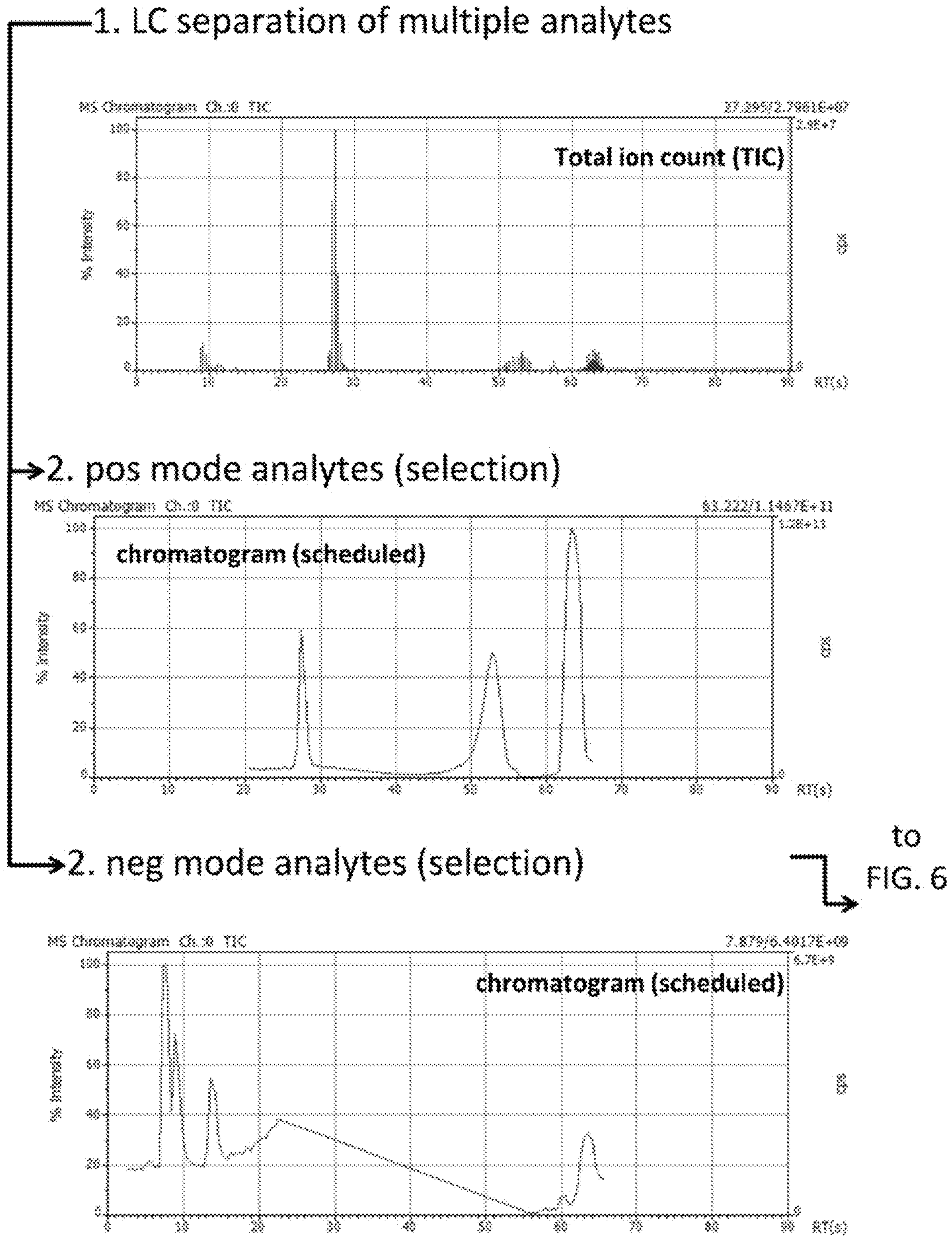
FIG. 5, FIG. 6, FIG. 7, FIG. 8*a* and FIG. 8*b* illustrate example measurement results obtained when using the techniques of the present disclosure.

As shown in FIG. 5, mass spectrometry measurements in a positive mode (middle curve shows chromatogram of positive mode analytes) and a negative mode (lower curve shows chromatogram of negative mode analytes) are carried out. As can be seen, the different substances of the mix are separated in the LC process. The upper curve shows a total ion count signal for the example mix indicating signals for all substances or analytes included in the mix.

Figure 6:
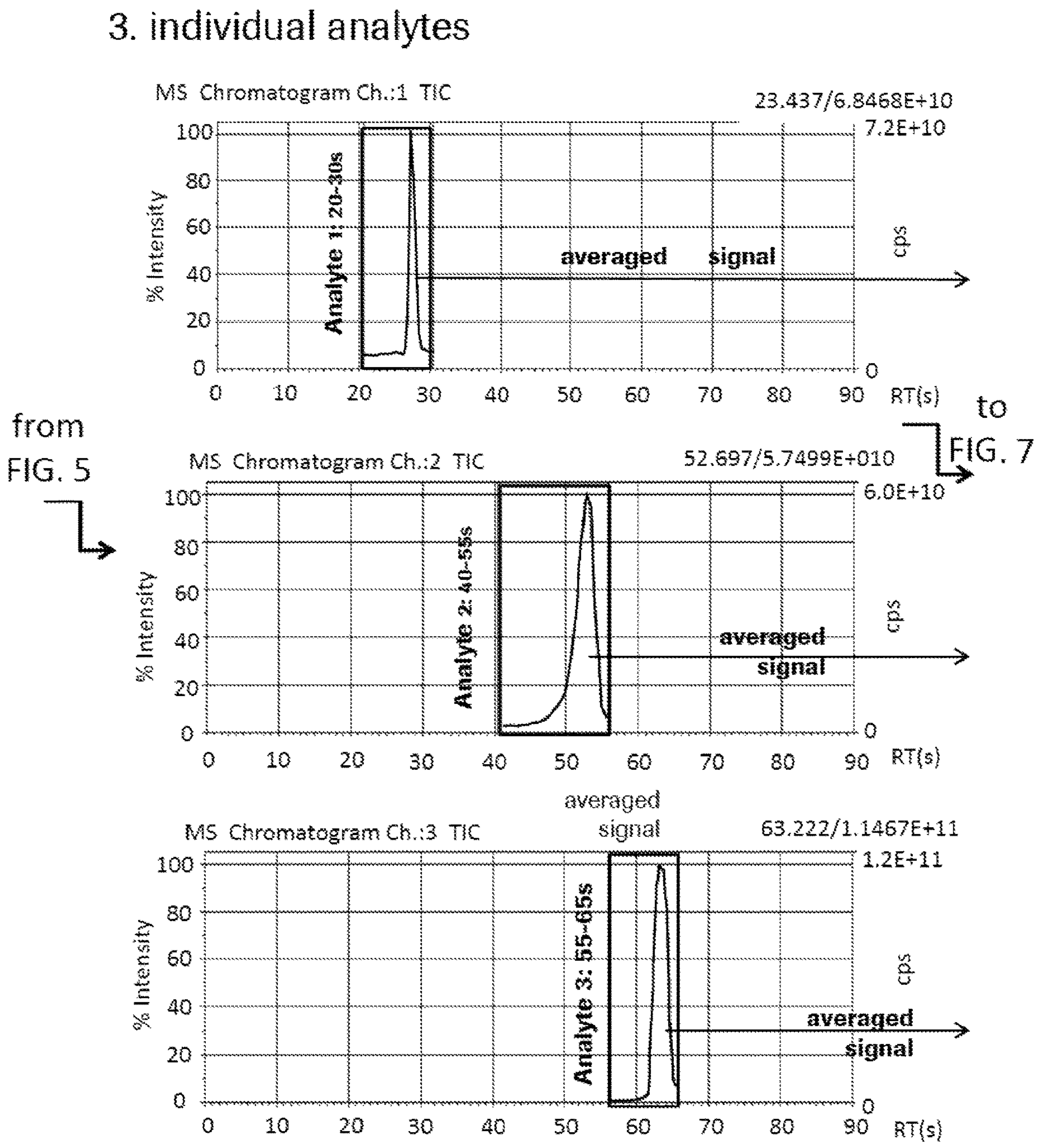

FIG. 6 shows the three peaks of the chromatogram for the positive mode analytes or substances which can be found at different retention times. Now, the technique continues with performing multiple mass spectrometry measurements for each of the separated analytes or substances in the mix. In other words, during a measurement window of a predetermined size (10 s and 15 s in the example of FIG. 6), full scan mass spectrometry measurements are carried out for a particular analyte. Again, different measurements can be performed during the measurement window (e.g., using different mass filters, scan velocities and scan resolutions). This might include, in the time window for a particular analyte (e.g., at retention times between 40 s and 55 s for the analyte or substance in the middle graph of FIG. 6), switching between different measurement modes of the mass spectrometer.

Figure 7:
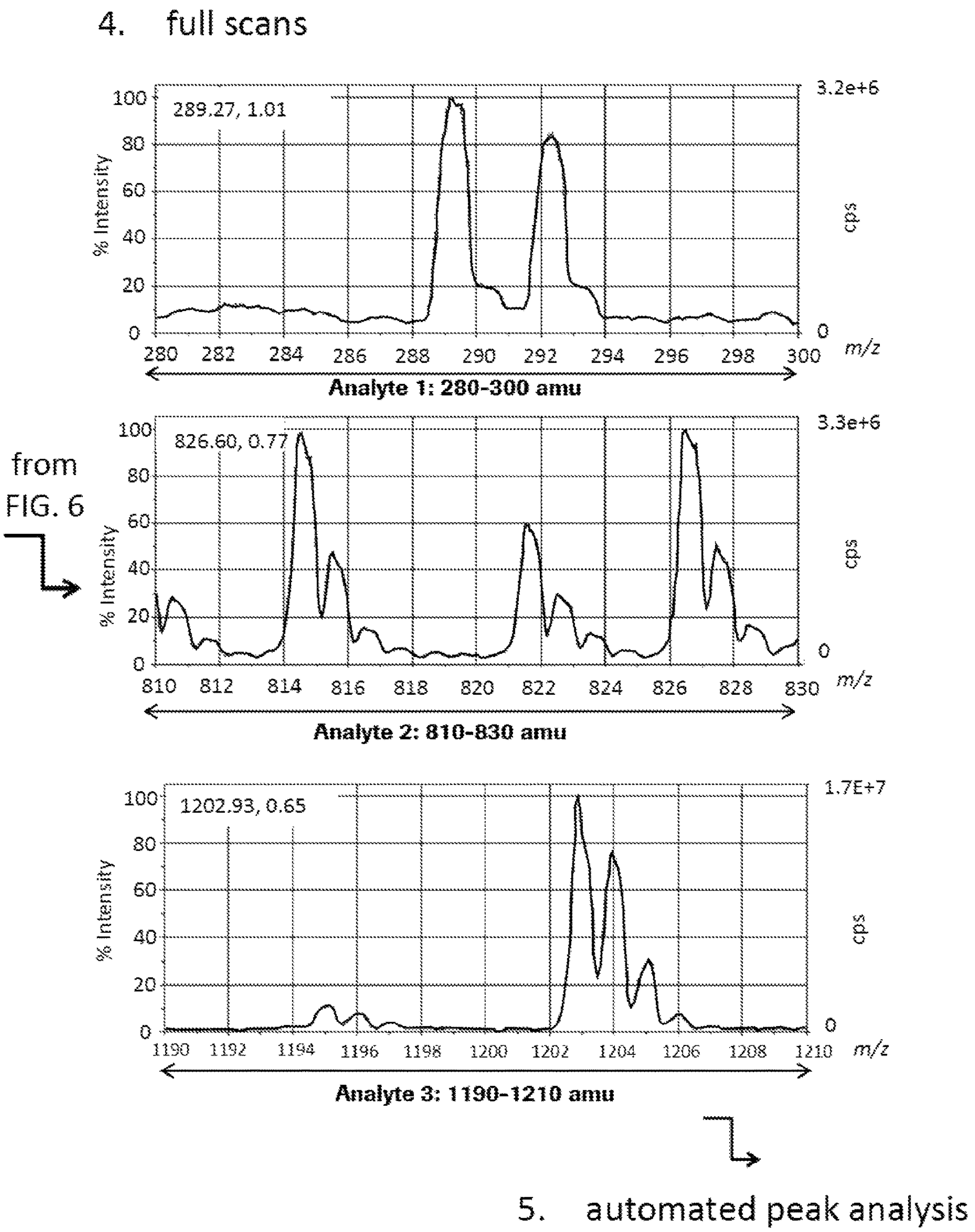

FIG. 7 shows example mass spectrometry measurement results for the three analytes of the (selected) chromatogram of FIG. 6. As can be seen, the mass spectrometry measurements are performed in a fall scan mode with a relatively small measurement range. In the example of FIG. 7, the measurement range is 20 amu for each analyte or substance. However, as discussed above, other measurement ranges (e.g., 10 amu or smaller or 3 amu or smaller) can be used in other examples. The measurement data depicted in FIG. 7 is an example for mass spectrometry raw data as discussed in connection with FIG. 3 above. As can be seen, multiple peaks are resolved for each of the three analytes substances.

These peaks are subsequently analyzed in an automated data processing step (as discussed above in connection with FIG. 4). The results of this process for the example of FIGS. 5 to 8 is depicted in FIG. 8*a* and FIG. 8*b*.

Figure 8A:
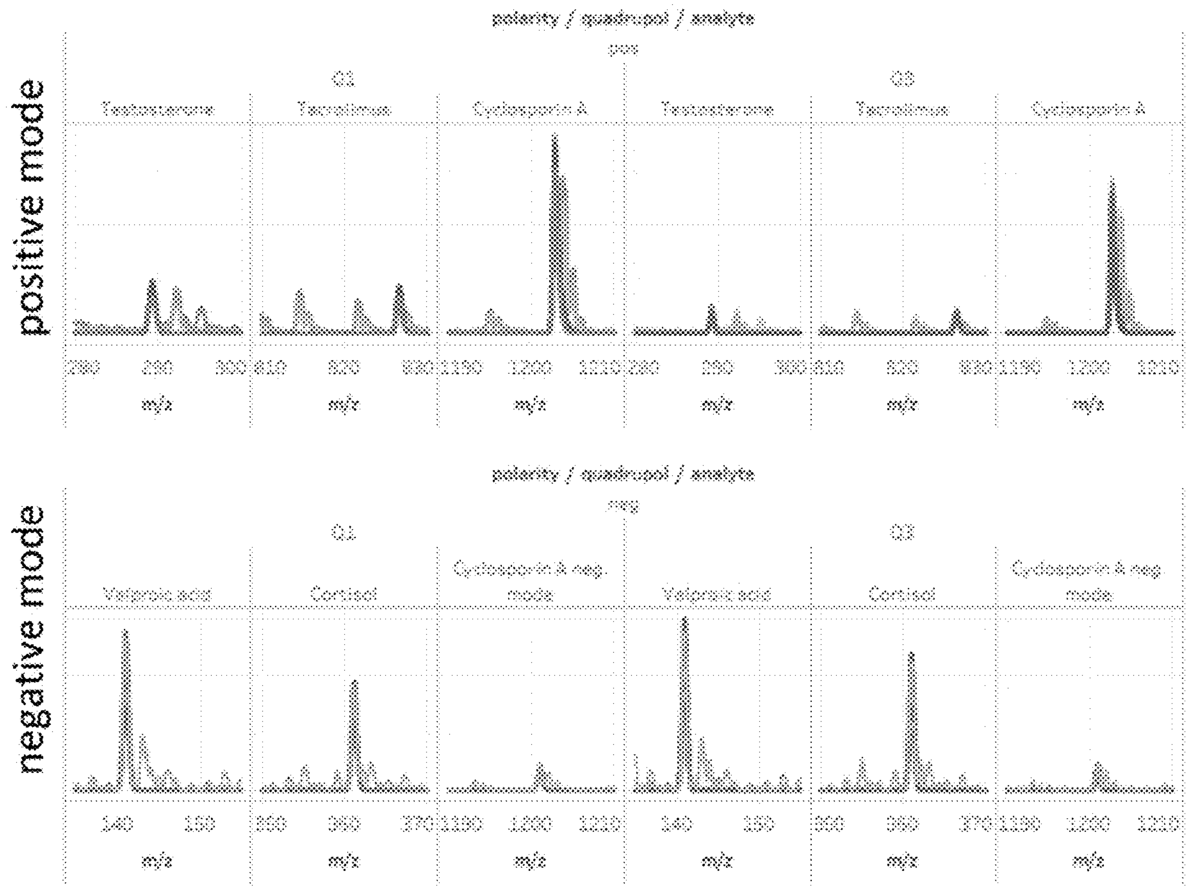
Figure 8B:
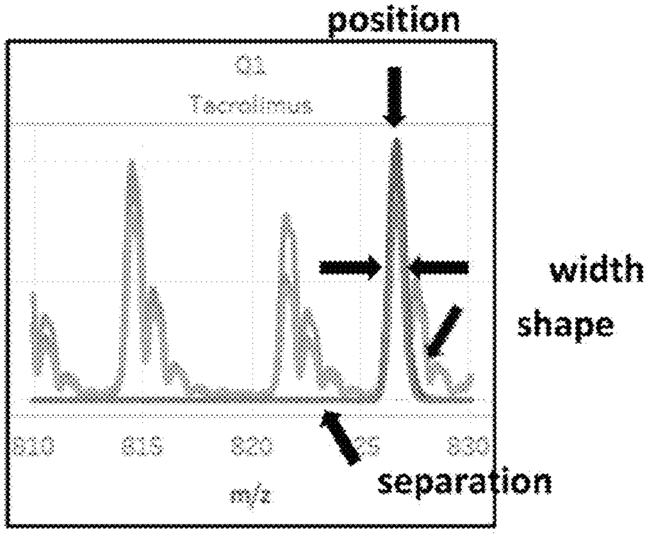

FIG. 8*a* shows an example group of measurement results which have been processed by using an automated peak recognition and fitting technique according to the present disclosure. In addition, FIG. 8*a* illustrates the different measurements for each of the substances or analytes of the mix of substances spanning the measurement range of the mass spectrometer. As can be seen, the example mass axis checking technique includes measurements in a positive mode and a negative mode for some analytes or substances (e.g., Cyclosporin A). In addition, the different measurements include measurements with different mass filters (e.g., a Q1 and Q3 mass filter of a tandem mass spectrometer) for some analytes or substances (e.g., testosterone, tacrolimus and cortisol). Furthermore, for some analytes, measurements in a negative and a positive mode for different mass filters are carried out (Cyclosporin A).

As discussed above, other types of measurements can be carried out for the different analytes or substances when using the mass axis checking techniques according the present disclosure. For example, the different measurements can include measurements at different scan speeds or resolutions. In addition, a different number of measurements can be carried out for one or more of the analytes or substances of the mix (for example, three or more than three different measurements).

Returning to FIG. 8*a*, the peak fitting and peak recognition technique can be configured to recognize and fit a single peak in the measurement results (for each measurement and each analyte or substance). For the example of the measurement in positive mode and the Q1 mass filter for tacrolimus, a peak at an m/z ratio of approximately 826.5 is recognized and fitted.

The peak recognition procedure can include using reference data (e.g., theoretical values for peaks of the substances or analytes of the mix). The peak fitting can include any known numerical signal processing technique. For example, a single gaussian can be used as fitting function in some examples.

In the example of FIG. 8*a*, a single peak is fitted per measurement. In other examples, multiple peaks can be recognized and fitted.

After the peaks (one or multiple peals per measurement) have been recognized and fitted, the measurement parameters (peak parameters) are determined (again in an automated process). FIG. 8*b* shows an example set of peak parameters determined for the measurement in positive mode and the Q1 mass filter for tacrolimus. In the example, a peak width ("resolution"), e.g., a FWHM peak width, a position (e.g., a m/z position of the peak), a peak shape parameter (e.g., a determined by evaluating residuals of a fitting process) and a baseline separation parameter can be determined.

As discussed above, further and/or different measurement parameters (and particularly peak parameters) can be determined in other examples.

In a further step, the so determined measurement parameters are compared to reference data to determine if a mass axis condition of the mass spectrometer is out of specification.

Analyzer Details

The present disclosure also relates to an analyzer system including a mass spectrometer (MS) (optionally connected to two or more liquid chromatography (LC) streams), the analyzer being configured to carry the steps of the mass axis checking techniques of the present disclosure.

Figure 9:
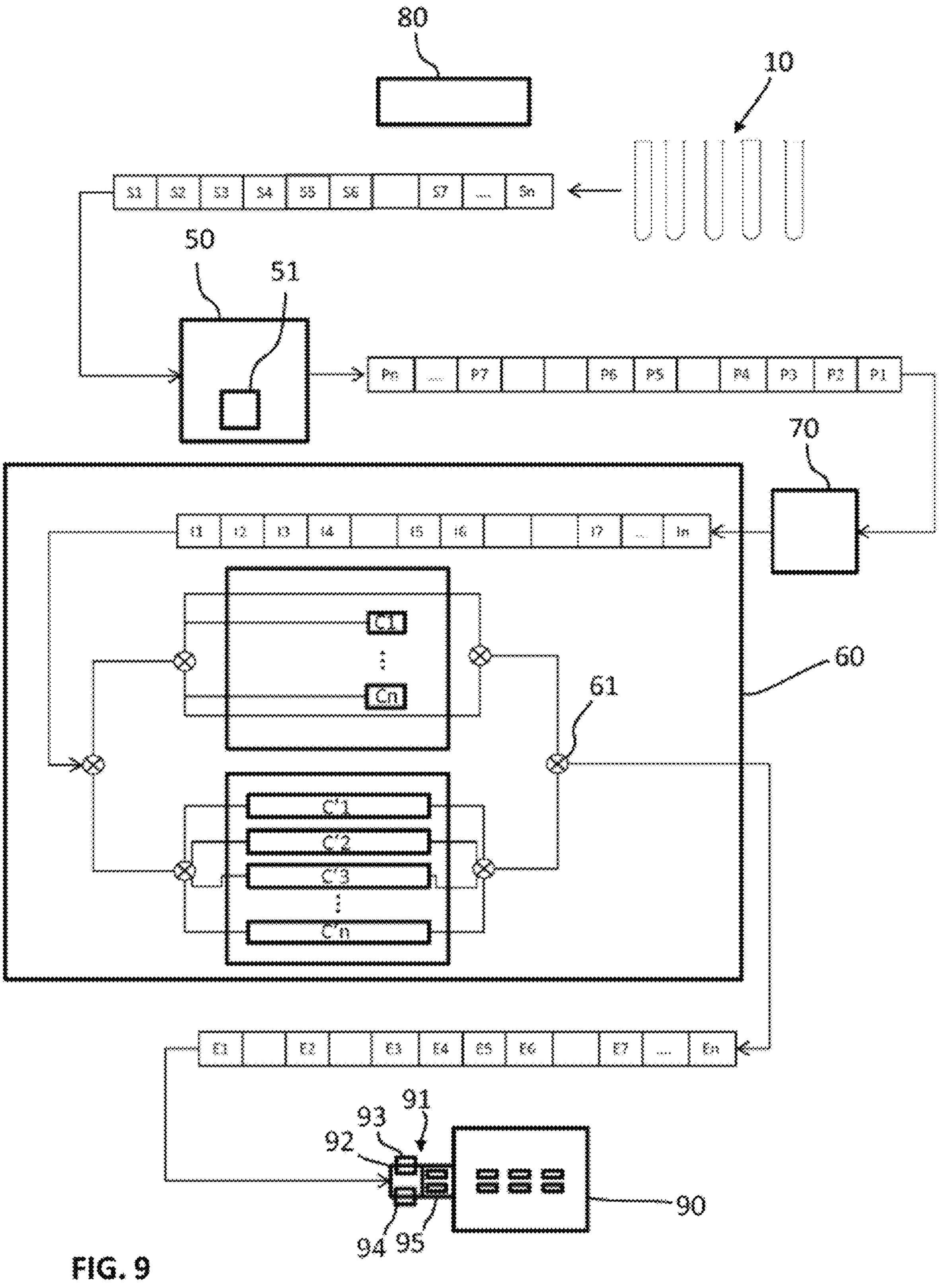
FIG. 9 shows an example analyzer system according to an embodiment of the present disclosure.

An example automated analyzer system including a mass spectrometer according to the present disclosure will subsequently be discussed in connection with FIG. 9. The different modules are shown in FIG. 9 as part of one automated analyzer system 100. However, the automated analyzer systems of the present disclosure can also include only a sub-set of the different modules depicted in FIG. 9.

The automated analyzer system 100 comprises a sample preparation station 50 for the automated pre-treatment and preparation of samples 10 comprising analytes of interest. The sample preparation station 50 can comprise a magnetic bead handling unit 51 for treating samples with magnetic beads carrying analyte and/or matrix selective groups.

The sample preparation station 50 can be configured to carry out the process of preparing the mass axis check sample of the present disclosure.

In particular, the magnetic bead handling unit can include at least one magnetic or electromagnetic workstation for holding at least one reaction container and for manipulating magnetic beads added to a sample or samples contained therein. The magnetic bead handling unit may further comprise a mixing mechanism for mixing fluids and/or resuspending the magnetic beads in the reaction container(s), e.g., by shaking or agitating the reaction container(s), e.g., by an eccentric rotation mechanism.

Alternatively, the bead handling unit may be a flow-through system where the magnetic beads are captured in a stream or capillary flow-through device. According to this example, capturing, washing and releasing of analytes can be done by repeatedly magnetically capturing and releasing beads in a flow-through stream.

The term "bead" does not necessarily refer to a spherical shape but to a particle having an average size in the nanometer or micrometer range and having any possible shape. The beads can be supra- or paramagnetic beads, in particular beads comprising an $Fe^{3+}$ core.

Non-magnetic beads may also be used. In that case capturing and releasing may be based on filtration. The sample preparation station may further comprise one or more pipetting device or fluid transport device for adding/removing fluids, such as samples, reagents, wash fluids, suspension fluids, into/from the reaction container(s).

The sample preparation station may further comprise a reaction container transporting mechanism (not shown in FIG. 9).

In alternative or in addition to magnetic bead handling, other enrichment techniques may be used, e.g., protein precipitation followed by centrifugation, cartridge based solid phase extraction, pipette tip based solid phase extraction, liquid extraction, affinity-based extraction (immunosorption, molecular imprints, aptamers, etc.).

The clinical diagnostic system 100 further comprises a liquid chromatography (LC) separation station 60 comprising a plurality of LC streams CI-n, C' I-n.

The liquid chromatography (LC) separation station 60 can be an analytical apparatus or module or a unit in an analytical apparatus designed to subject the prepared samples to chromatographic separation in order for example to separate analytes of interest from matrix components, e.g., remaining matrix components or other potentially interfering substances after sample preparation that may still interfere with a subsequent detection, e.g., a mass spectrometry detection, and/or in order to separate analytes of interest from each other in order to enable their individual detection. In some examples, the LC separation station can be an intermediate analytical apparatus or module or a unit in an analytical apparatus designed to prepare a sample for mass spectrometry and/or to transfer the prepared sample to a mass spectrometer.

According to certain examples of the present disclosure the LC separation station comprises at least one faster LC stream with a shorter cycle time and at least one slower LC stream with a longer cycle time. However, the LC separation station may alternatively comprise at least two faster LC streams without slower LC streams or at least two slower LC streams without faster LC streams. A "cycle time" is the time that it takes from a sample input (injection) into an LC stream until the same LC stream is ready for another sample input. In other words, a cycle time is the minimum time elapsing between two consecutive sample inputs in the same LC stream under pre-determined conditions and can be measured in seconds. The cycle time includes injection time, separation time until elution of the last analyte of interest, and re-equilibration time in order to prepare the column for a new injection.

The terms "faster" and "slower" with reference to an LC stream are only relative terms used to compare different LC stream between them in the same LC separation station. In particular, the terms are related to the duration of the cycle time and not necessarily to the resolution capabilities of the LC streams.

The LC separation station typically further comprises also a sufficient number of pumps, e.g., binary pumps in case of conditions requiring the use of elution gradients, and several switching valves.

In addition, as the LC separation station includes a plurality of LC streams, it is advantageous that LC eluates from different LC streams are outputted in a staggered manner and not simultaneously so that LC eluate outputs can be detected sequentially, e.g., by a single common detector, and better distinguished from each other following a multiplexed approach.

The term "LC eluate" is herein used to indicate a fraction of the eluate that comprises at least one analyte of interest.

In routine practice, depending on the number and type of incoming samples and respective analysis orders, one LC stream rather than another, e.g., a slower LC stream rather than a faster LC stream or vice versa, a type of column in an LC stream rather than another type of column in another LC stream, could be required. It is thus possible that use of some LC stream is more frequent than use of other LC streams.

Different degrees of flexibility are possible based also on the number and type of LC streams, e.g., on the number and type of the faster and slower LC streams respectively.

In the example of FIG. 9 the CI-n are faster LC streams with a shorter cycle time and C'I-n are slower LC streams (e.g., with a longer cycle time) and where n can be any integer number equal or greater than 1.

Thus, the LC separation station 60 may comprise at least one faster LC stream CI with a shorter cycle time and at least one slower LC stream C1 with a longer cycle time. However, the LC separation station 60 may comprise a plurality of only faster LC streams CI-n, where n is at least 2, or a plurality of only slower LC streams C'I-n, where n is at least 2. In this example, the LC separation station 60 comprises two faster LC streams CI-n, where n=2, with a shorter cycle time and four slower LC steams C'I-n, where n=4, with a longer cycle time, where the relative length of the respective shorter and longer cycle times is schematically indicated (not to scale) by the different length of the bars representing the LC streams CI-n and C'I-n respectively in FIG. 9. The shorter cycle time can be between 10 seconds and 1 minute (for example 36 seconds) and this time defines a reference period. The longer cycle time is n times the reference period.

Also, the elution time windows of the slower LC streams for the elution of analytes of interest are set to be as long as or shorter than the reference period by choosing the LC columns and setting the chromatographic conditions accordingly.

The faster LC streams CI-n can be rapid trap and elute online liquid chromatography streams, one of which comprising for example a reversed phase column and the other comprising for example a HILIC column. The slower LC streams C'I-n can be ultra-high-performance liquid chromatography (UHPLC) streams comprising for example two reversed phase columns and two HILIC columns respectively.

The slower LC streams may be the same or different between them, e.g., one comprising a HILIC column and one comprising a reversed phase (RP) or a pentafluorophenyl (PFP) column, where the conditions are selected such that the cycle time can be the same for different columns respectively. The faster LC stream(s) may be the same or different between them respectively, e.g., one comprising a HILIC column and one comprising a reversed phase (RP) or a pentafluorophenyl (PFP) column, where the conditions are selected such that the cycle time can be the same for different columns respectively.

According to an example, the at least one faster LC stream is a capillary flow injection analysis (FIA) stream or a rapid trap and elute online liquid chromatography stream and the at least one slower LC stream is an ultra-high-performance liquid chromatography (UHPLC) stream. In particular, depending on the analytes of interest each prepared sample may be inputted into a faster LC stream or into a slower LC stream. For example, if a sample requires only analyte purification and concentration, since sufficient separation can be obtained for example in a subsequent mass spectrometry analysis and/or other separation technique, the sample is inputted into a faster LC stream, e.g., a FIA or rapid trap and elute online liquid chromatography stream. In such a case, a stationary phase is chosen that retains the analytes of interest whereas any salts, buffer, detergents and other matrix components are unretained and washed away. This process is typically followed by elution of the analytes, e.g., in back flush mode, with a different mobile phase or a solvent gradient. Depending on the analytes, separation of some analytes may be expected in some cases. On the other hand, in case of analytes having identical masses (isobaric) and/or overlapping daughter ion spectra in multiple reaction monitoring (MRM), when it comes to mass spectrometry, a more extensive chromatographic separation might be typical. In that case the sample is imputed into a slower LC stream, e.g., a UHPLC stream.

The automated analyzer system 100 further comprises a sample preparation/LC interface 70 for inputting prepared samples into any one of the LC streams CI-n, C'I-n.

The sample preparation/LC interface can be a module between the sample preparation station and the LC separation station or a unit integrated in the sample preparation station or in the LC separation station or sharing components between the sample preparation station and the LC separation station.

The sample preparation/LC interface may comprise a container handling unit or a prepared sample receiving unit with any one or more of a holding function, a gripping function, a transfer function. In some examples, the prepared sample receiving unit is a reusable recess into which prepared samples are received one after another according to the prepared sample output sequence just before being inputted into an LC stream, where the recess may be washed between consecutive samples.

The sample preparation/LC interface can include a liquid handling unit to input prepared samples to any of the LC streams. The liquid handling unit may comprise any one or more of a pipetting device, a pump, an autosampler, a flow-injection device, one or more switching valves, in particular at least one switching valve to switch between LC streams. In particular, the container handling unit and the liquid handling unit can be designed to enable random access of any available LC stream to any prepared sample.

A combination of both the analyte enrichment technique and the matrix depletion technique, at least for some samples, may have the advantage to extend the number of different analytes that can be extracted from a sample, to avoid unnecessary dilutions, and to be more effective at removing the matrix.

The automated analyzer system 100 further comprises a controller 80 configured to control the automated analyzer system.

The controller 80 can be configured to carry out the steps of the mass axis checking techniques of the present disclosure. In particular, the controller can include an automated scheduler for scheduling the mass spectrometry measurements of the present disclosure.

In addition, the controller can be programmed to assign samples 10 to pre-defined sample preparation workflows each comprising a pre-defined sequence of sample preparation steps and requiring a pre-defined time for completion depending on the analytes of interest.

In particular, the controller may cooperate with a scheduler in order to take into account received analysis orders and a number of scheduled process operations associated with the execution of the analysis orders in order to decide when and which sample has to be prepared and for each sample when and which preparation step has to be executed. As different types of samples and/or different analytes of interest contained in the same or different types of samples may require different preparation conditions, e.g., different reagents, or different number of reagents, different volumes, different incubation times, different washing conditions, etc., preparation of different samples may require different sample preparation workflows. The controller is thus programmed to assign samples to pre-defined sample preparation workflows each comprising a pre-defined sequence of sample preparation steps, including e.g., different steps and/or a different number of steps, and requiring a pre-defined time for completion, e.g., from a few minutes to several minutes.

The controller thus may schedule sample preparation to occur in parallel or in a staggered manner for different samples. By doing so in a logical manner, the controller schedules the use of functional resources of the sample preparation station in order to increase efficiency while avoiding conflicts and maximizes throughput by preparing samples at a pace at which prepared samples can be inputted into the LC separation station. This means that rather than preparing a batch of samples in advance, which of course is also possible, the controller can instruct the sample preparation station to prepare samples as needed or as can be taken from the LC separation station, in particular by the individual LC streams, while taking into account incoming orders, e.g., priority orders, time of preparation, required use of functional resources, and especially availability of the LC stream for which that sample is intended by the time sample preparation is completed. In particular, the controller can schedule the preparation of the mass axis check sample according to the present disclosure.

In the example of FIG. 9, the controller 80 is further programmed to assign (reserve in advance) an LC stream CI-n, C'I-n for each prepared sample depending on the analytes of interest and to plan an LC stream input sequence II-n for inputting the prepared samples that allows analytes of interest from different LC streams CI-n, C'I-n to elute in a non-overlapping LC eluate output sequence EI-n based on expected elution times. In the same manner, the controller 80 is further programmed to assign (reserve in advance) an LC stream CI-n, C'I-n for the mass axis check sample.

The controller 80 is further programmed to set and initiate a sample preparation start sequence SI-n that generates a prepared sample output sequence PI-n that matches the LC stream input sequence Fn.

In FIG. 9 each sample of the sample preparation start sequence SI-n, each prepared sample of the prepared sample output sequence PI-n and LC stream input sequence II-n, each LC eluate of the LC eluate output sequence EI-n is indicated in a segment of a sequence comprising non-overlapping adjacent segments, each segment representing schematically one reference period. Each sequence is thus a sequence of reference periods or time units, the length of which can be fixed and remains constant across the different sequences. In particular the shorter cycle time of the faster LC stream can be taken as reference period (for example 36 seconds).

Preparation of new samples in the sample preparation start sequence SI-n is started with a frequency of one sample per reference period, i.e., every 36 seconds in this example, or at intervals separated by one or more reference periods, indicated by empty segments in the sequence, in which no sample preparation is started. Also, preparation of samples in the prepared sample output sequence PI-n is completed with a frequency of one prepared sample per reference period or at intervals separated by one or more reference periods, indicated by empty segments in the sequence, in which no sample preparation is completed. Also, the prepared samples are inputted in the respective assigned LC streams according to the LC stream input sequence 11-*n* with a frequency of one LC stream input per reference period or at intervals separated by one or more reference periods, indicated by empty segments in the sequence, in which no LC stream input takes place.

Also, the LC eluates in the LC eluate output sequence EI-n are outputted with a frequency of one LC eluate per reference period or at intervals separated by one or more reference periods, indicated by empty segments in the sequence, in which no LC eluate is outputted.

The clinical diagnostic system 100 further comprises a mass spectrometer (MS) 90 and an LC/MS interface 91 for connecting the LC separation station 60 to the mass spectrometer 90.

According to an example, the LC/MS interface comprises an ionization source, for the generation of charged analyte molecules (molecular ions) and transfer of the charged analyte molecules into the gas phase. According to certain examples, the ionization source is an electro-spray-ionization (ESI) source or a heated-electrospray-ionization (HESI) source or an atmospheric-pressure-chemical-ionization (APCI) source or an atmospheric-pressure-photo-ionization (APPI) or an atmospheric-pressure-laser-ionization (APLI) source. The LC/MS interface may comprise however a double ionization source, e.g., both an ESI and an APCI source or a modular exchangeable ionization source. Such ionization sources are known in the art and not further elucidated here.

In order to optimize ionization conditions, it may be typical to adjust solvent composition by adding a make-up flow directly before the ion source to adjust pH, salts, buffers or organic content.

In one example, all LC streams are alternately connectable to the ionization source and the controller controls a valve switching according to the LC eluate output sequence.

In one example, the mass spectrometer is a fast scanning mass spectrometer. For instance, the mass spectrometer can be a tandem mass spectrometer capable of selecting parent molecular ions, generating fragments by collision induced fragmentation and separating the fragments or daughter ions according to their mass to charge (m/z) ratio. The mass spectrometer can be a triple quadrupole mass spectrometer, as known in the art.

According to an example, the LC/MS interface further comprises an ion mobility module between the ionization source and the mass spectrometer. According to an example, the ion mobility module is a high-field asymmetric waveform ion mobility spectrometry (FAIMS) module, as also known in the art, and that can achieve separation of molecular ions in the gas phase, including isobaric ions, in milliseconds. An ion mobility gas-phase separation before mass spectrometry could compensate for insufficient chromatographic separation, e.g., of isobaric interferences, especially for LC eluates from the at least one faster LC stream. Furthermore, ion mobility interfaces for mass spectrometers can reduce the overall background signal by preventing background and other nonspecific ions to enter the mass spectrometer. According to an example, the controller is further programmed to set an ionization source input sequence. The term "ionization source input sequence" refers to the order in which LC eluates are inputted into the ionization source. Typically, the ionization source input sequence corresponds to the LC eluate output sequence. However, by using for example bypass streams or streams of different length or changing the flow velocity the ionization source input sequence may be also changed. This allows the controller to have even more flexibility when planning the LC stream input sequence.

In some examples, LC eluates in the LC eluate output sequence are inputted into the ionization source with a frequency of one LC eluate per reference period or at intervals separated by one or more reference periods. This means that there may be empty reference periods without an LC eluate being inputted into the ionization source, in the same time line consisting of a sequence of reference periods, among reference periods in which there is an ionization source input. The controller can be programmed to make sure that only one LC eluate per reference period is inputted into the ionization source by taking into account the LC stream input sequence and the LC eluate output sequence and by controlling valve switching accordingly.

In the example of FIG. 9, The LC/MS interface 91 comprises an ionization source 92 and an ion mobility module 95 between the ionization source 92 and the mass spectrometer 95. The ion mobility module 95 is a high-field asymmetric waveform ion mobility spectrometry (FAIMS) module. The mass spectrometer 90 is a tandem mass spectrometer and in particular a triple quadrupole mass spectrometer, capable of multiple reaction monitoring (MRM).

The LC streams CI-n, C'I-n are alternately connectable to the LC/MS interface 91 and the controller 80 controls a valve switching 61 according to the LC eluate output sequence EI-n for inputting one LC eluate at a time into the ionization source 92. In particular, the LC eluates in the LC eluate output sequence EI-n are inputted into the ionization source 92 with a frequency of one LC eluate per reference period or at intervals separated by one or more reference periods according to the LC eluate output sequence EI-n. The ionization source 92 is a double ionization source, including an ESI source 93 and an APCI source 94, where depending on the LC eluate in the LC eluate output sequence EI-n and on the analyte(s) of interest contained therein the controller 80 may select one of the two ionization sources 93, 94 that is most appropriate. When setting the sample preparation start sequence SI-n, the controller 80 may group together (place adjacent to each other in the sequence) samples also according to the ionization source 93, 94 so that frequent switch between ionization sources 93, 94 is prevented. Ionization source switching may be planned during one or more empty reference periods for example.

Computer Implementation Aspects

The present disclosure also relates to a computer system being configured to carry out the techniques of checking a validity of a mass axis calibration of a mass spectrometer.

In some examples, the computer system can be a controller of the analyzer (or part thereof). However, in other examples, the computer system can be only connected to the analyzer through a network and not be part of the controller of the analyzer. For instance, the computer system can be a hospital or laboratory management system, or a computer system of a vendor or service provider of the analyzers.

The computing systems of the present disclosure are not limited to a particular software or hardware configuration. As long as a software or hardware configuration is capable of carrying out the steps of the checking a validity of a mass axis calibration of a mass spectrometer according to the present disclosure the computing system can have this software or hardware configuration.

The present disclosure also relates to a computer-readable medium having instructions stored thereon which when carried out by a computer system prompt the computer system to carry out the steps of the checking a validity of a mass axis calibration of a mass spectrometer according to the present disclosure.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps as disclosed herein may be performed by using a computer or a computer network, typically by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

FURTHER ASPECTS

A number of aspects of the techniques of checking a validity a mass axis calibration of a mass spectrometer of the present disclosure have been discussed in the preceding sections. In addition, the checking techniques the present disclosure can also be carried out according to the following aspects:

1. A method for checking a validity of a mass axis calibration of a mass spectrometer (MS) of an analyzer system, the method comprising:
   - obtaining a mass axis check sample spanning a predetermined m/z measurement range of the mass spectrometer;
   - automatically processing the mass axis check sample, comprising:
     - performing multiple full scan mode MS measurements of different types using the MS for the at least two mass axis points within the predetermined m/z measurement range of the MS to obtain measurement data,
     - wherein the different types include at least a first full scan MS measurement in a positive mode and a second measurement in a negative mode or at least a first full scan measurement for a first mass filter of the mass spectrometer and a second full scan mode for a second mass filter of the mass spectrometer;

wherein the multiple different full scan MS measurements are selected so that a maximum measurement time in the mass spectrometer is below 5 minutes;

comparing the measurement data for each of the at least two mass axis points with respective reference data;

determining if a mass axis calibration condition is out of specification based on a result of the comparing steps.

2. The method of aspect 1, wherein the mass axis check sample includes:

a mix of two or more different substances spanning a full m/z-measurement range of the mass spectrometer, wherein the at least two mass axis points are provided by different substances in the mix; or a single substance being able to fragment into two or more fragments of different m/z values, wherein the at least two mass axis points are provided by different fragments; or one or more substances selected to form clusters by a combination of ions or atoms or molecules in the mass spectrometer at different m/z values to provide the at least two mass axis points.

3. The method of aspect 1 or aspect 2, further comprising scheduling processing of the mass axis check sample in an automated scheduling process of the analyzer system, typically wherein the maximum measurement time is below 2 minutes.

4. The method of any one of the preceding aspects 1 to 3, further comprising: processing the mass axis check sample in a single chromatography run to separate two or more substances included in the mass axis check sample prior to the step of performing multiple full scan mode mass spectrometry measurements.

5. The method of any one of the preceding aspects 3 to 4, wherein scheduling processing of the mass axis check sample in an automated scheduling process includes minimizing an impact on the throughput of the mass spectrometer or an analyzer including the mass spectrometer.

6. The method of any one of the preceding aspects, wherein the mass axis check sample includes molecules having fragments or clusters of different m/z values to cover the m/z measurement range of the mass spectrometer.

7. The method of any one of aspects 1 to 6, wherein comparing the measurement data for each of the at least two mass axis points with respective reference data includes:

evaluating at least one peak in the measurement data for each of the mass axis points to obtain at least one measurement parameter for each of the at least two mass axis points;

comparing the at least one measurement parameter for each of the at least two mass axis points with respective reference data; and determining if a mass axis calibration condition is out of specification based on a result of the comparing steps.

8. The method of aspect 7, wherein the at least one measurement parameter includes one or more of a peak position, a peak width, a peak-baseline separation and a peak shape.

9. The method of aspect 8, wherein the at least one measurement parameter includes a peak position and a peak width.

10. The method of any one aspects 1 to 9, further comprising;

scheduling or triggering a mass axis adjustment procedure including separate measurements if the determining step yields that the mass axis calibration condition is out of specification or resuming operation of the mass spectrometer if the mass axis calibration condition is not out of specification.

11. The method of any one of aspects 1 to 10, wherein comparing the measurement data for each of the at least two mass axis points with respective reference data includes fitting at least one peak in the measurement data for each of the at least two mass axis points to obtain at least one measurement parameter for each of the at least two mass axis points.

12. The method of any one of aspects 1 to 11, wherein the maximum measurement time is selected as a duration of a measurement window of a production sample of the mass spectrometer, or an integer multiple of a duration of a measurement window of a production sample of the mass spectrometer.

13. The method of any one of the preceding aspects 1 to 12, wherein the maximum measurement time is below 2 minutes.

14. The method of any one of the preceding aspects 1 to 13, wherein the method of checking a validity of a mass axis calibration of a mass spectrometer includes at least 50 measurement cycles with a mass interval of at least 2 amu.

15. The method of any one of the preceding aspects 1 to 14, wherein the method is repeatedly performed during a production mode of the mass spectrometer, optionally wherein the method is performed at least once every day or at least once every 400 samples analyzed by the mass spectrometer.

16. The method of any one of the preceding aspects 1 to 15, wherein the method is carried out at one or more of the following occasions:

during a quality control routine of the mass spectrometer or of the analyzer including the mass spectrometer;

during a regular instrument check of the mass spectrometer or of the analyzer including the mass spectrometer;

during a start-up procedure of the mass spectrometer or of the analyzer including the mass spectrometer;

regularly during a down-time of the mass spectrometer or of the analyzer including the mass spectrometer;

after a service or maintenance operation of the mass spectrometer or of the analyzer including the mass spectrometer.

17. The method of any one of the preceding aspects 1 to 16, wherein the method is carried out upon occurrence of a trigger event, the trigger event including one or more of:

a status change of the mass spectrometer or the analyzer system including the mass spectrometer, a monitored parameter of the mass spectrometer or the analyzer system including the mass spectrometer assuming a particular value or passing a particular threshold;

a monitored parameter of an environment of the mass spectrometer; or a detection of an error in the mass spectrometer or the analyzer system including the mass spectrometer.

18. The method of any one of the preceding aspects 1 to 17, wherein performing mass spectrometry measurements to obtain measurement data for each of the at least two mass axis points includes using disjunct and predefined measurement ranges for each mass axis point.

19. The method of aspect 18, wherein a measurement range is narrower than 10 amu, optionally narrower than 2 amu.

20. The method of any one of the preceding aspects 1 to 19, wherein the m/z measurement range of the mass spectrometer is a maximal m/z measurement range provided by the mass spectrometer.

21. The method of any one of the preceding aspects 1 to 20, wherein the m/z measurement range of the mass spectrometer spans 10 amu to 5000 amu, optionally 15 amu to 3000 amu.

22. The method of any one of the preceding aspects 1 to 21, wherein the m/z-measurement range of the mass spectrometer is defined by a plurality of analytes and/or clusters to be measured by the mass spectrometer, the m/z-measurement range spanning an m/z range from an analyte requiring the lowest m/z ratio to an analyte requiring the highest m/z ratio of the plurality of analytes to be measured by the mass spectrometer.

23. The method of any one of the preceding aspects 1 to 22, wherein comparing the measurement data includes averaging over multiple mass spectrometer measurement cycles.

24. The method of aspect 23, wherein results of the multiple full scan mode MS measurements of different types are combined to obtain the measurement data for each of at least two m/z points, optionally wherein results of the multiple full scan mode MS measurements of different types are averaged to obtain the measurement data for each of at least two m/z points.

25. The method of any one of the preceding aspects 1 to 24, wherein the multiple full scan mode MS measurements of different types further includes one or more measurement selected from the list consisting of:

a measurement in a negative mode;

a measurement in a positive mode;

a measurement for a particular mass filter of the mass spectrometer;

measurements with different scan speeds;

measurements with different scan resolutions;

measurements using different ion sources of the analyzer system; and measurements using different detectors of the analyzer system.

26. The method of any one of the preceding aspects 1 to 25, wherein the analyzer system processes samples in a clocked manner and wherein the method for checking a validity of a mass axis calibration of a mass spectrometer of an analyzer system has a duration of one clock cycle or an integer multiple of one clock cycle.

27. The method of any one of the preceding aspects 1 to 26, wherein a preventive maintenance is scheduled if the step of determining if a mass axis calibration condition is out of specification yields that the mass axis calibration condition is within specification but within a predetermined distance from a threshold to being out of specification.

28. A computer system being configured to carry out the steps of any one of the methods of aspects 1 to 27.

29. The computer system of aspect 28, wherein the computer system is a controller of an analyzer system including a mass spectrometer.

30. The analyzer system of aspect 29, wherein the analyzer system is a clinical or diagnostic analyzer system.

31. A computer-readable medium including instructions stored thereon which when executed by a computer system including a mass spectrometer prompt the computer system to carry out the steps of any one of the methods of aspects 1 to 27.

What is claimed is:

1. A method for checking a validity of a mass axis calibration of a mass spectrometer (MS) of an analyzer system, wherein the analyzer system including the mass spectrometer operates based on a certain clock being a predetermined period of time for which a mass spectrometer processes one particular sample in a single measurement process, the method comprising:

obtaining a mass axis check sample spanning a predetermined m/z measurement range of the mass spectrometer;

automatically processing the mass axis check sample, comprising:

performing multiple full scan mode MS measurements of different types using the MS for at least two mass axis points within the predetermined m/z measurement range of the MS to obtain measurement data;

wherein the different types include at least a first full scan MS measurement in a positive mode and a second measurement in a negative mode or at least a first full scan measurement for a first mass filter of the mass spectrometer and a second full scan mode for a second mass filter of the mass spectrometer, wherein the multiple different full scan MS measurements are selected so that a maximum measurement time in the mass spectrometer is below 5 minutes;

comparing the measurement data for each of the at least two mass axis points with respective reference data, wherein comparing the measurement data includes averaging over multiple mass spectrometer measurement cycles; and determining if a mass axis calibration condition is out of specification based on a result of the comparing steps.

2. The method of claim 1, wherein the mass axis check sample includes:

a mix of two or more different substances spanning a full m/z-measurement range of the mass spectrometer, wherein the at least two mass axis points are provided by different substances in the mix; or a single substance being able to fragment into two or more fragments of different m/z values, wherein the at least two mass axis points are provided by different fragments; or one or more substances selected to form clusters by a combination of ions or atoms or molecules in the mass spectrometer at different m/z values to provide the at least two mass axis points.

3. The method of claim 1 further comprising scheduling processing of the mass axis check sample in an automated scheduling process of the analyzer system.

4. The method of claim 3, wherein the maximum measurement time is below 2 minutes.

5. The method of claim 1 further comprising:

processing the mass axis check sample in a single chromatography run to separate two or more substances included in the mass axis check sample prior to the step of performing multiple full scan mode mass spectrometry measurements.

6. The method of claim 1, wherein scheduling processing of the mass axis check sample in an automated scheduling process includes minimizing an impact on the throughput of the mass spectrometer or an analyzer including the mass spectrometer.

7. The method of claim 1, wherein comparing the measurement data for each of the at least two mass axis points with respective reference data includes:

evaluating at least one peak in the measurement data for each of the mass axis points to obtain at least one measurement parameter for each of the at least two mass axis points;

comparing the at least one measurement parameter for each of the at least two mass axis points with respective reference data; and determining if a mass axis calibration condition is out of specification based on a result of the comparing steps.

8. The method of claim 7, wherein the at least one measurement parameter includes one or more of a peak position, a peak width, a peak-baseline separation, and a peak shape.

9. The method of claim 1 further comprising:

scheduling or triggering a mass axis adjustment procedure including separate measurements if the determining step yields that the mass axis calibration condition is out of specification or resuming operation of the mass spectrometer if the mass axis calibration condition is not out of specification.

10. The method of claim 1, wherein the maximum measurement time is selected as a duration of a measurement window of a production sample of the mass spectrometer, or an integer multiple of a duration of a measurement window of a production sample of the mass spectrometer.

11. The method of claim 1, wherein the method of checking a validity of a mass axis calibration of a mass spectrometer includes at least 50 measurement cycles with a mass interval of at least 2 amu.

12. The method of claim 1, wherein performing mass spectrometry measurements to obtain measurement data for each of the at least two mass axis points includes using disjunct and predefined measurement ranges for each mass axis point.

13. The method of claim 1, wherein results of the multiple full scan mode MS measurements of different types are combined to obtain the measurement data for each of at least two m/z points.

14. The method of claim 1, wherein results of the multiple full scan mode MS measurements of different types are averaged to obtain the measurement data for each of at least two m/z points.

15. The method of claim 1, wherein the multiple full scan mode MS measurements of different types further includes one or more measurements selected from the list consisting of:

a measurement in a negative mode;

a measurement in a positive mode;

a measurement for a particular mass filter of the mass spectrometer;

measurements with different scan speeds;

measurements with different scan resolutions;

measurements using different ion sources of the analyzer system; and measurements using different detectors of the analyzer system.

16. The method of claim 1, wherein a preventive maintenance is scheduled if the step of determining if a mass axis calibration condition is out of specification yields that the mass axis calibration condition is within specification but within a predetermined distance from a threshold to being out of specification.

17. A computer system being configured to carry out the steps of the method of claim 1.

* * * * *